United States Patent [19]

Morita et al.

[11] Patent Number: 4,608,952
[45] Date of Patent: Sep. 2, 1986

[54] BALANCER CONTROL DEVICE FOR MULTIPLE-CYLINDER FOUR-CYCLE ENGINE

[75] Inventors: Shigeru Morita; Hideki Tanaka; Kyoichi Umemura, all of Hiroshima, Japan

[73] Assignee: Mazda Motor Corporation, Japan

[21] Appl. No.: 754,997

[22] Filed: Jul. 15, 1985

[30] Foreign Application Priority Data

Jul. 18, 1984 [JP] Japan .................. 59-149860

[51] Int. Cl.[4] ................ F02D 17/00; F16F 15/26
[52] U.S. Cl. ................... 123/198 F; 123/192 B
[58] Field of Search ......... 123/198 F, 192 B, DIG. 6, 123/DIG. 7

[56] References Cited

U.S. PATENT DOCUMENTS

| | | | |
|---|---|---|---|
| 4,000,666 | 1/1977 | Ito et al. | 123/192 B |
| 4,095,579 | 6/1978 | Iwasa et al. | 123/192 B |
| 4,125,036 | 11/1978 | Nakamura et al. | 123/192 B |
| 4,290,395 | 9/1981 | Sakano et al. | 123/192 B |
| 4,337,740 | 7/1982 | Sugasawa et al. | 123/198 F |
| 4,368,701 | 1/1983 | Huber et al. | 123/198 F |
| 4,389,985 | 6/1983 | Huber et al. | 123/198 F |
| 4,394,854 | 7/1983 | Huber | 123/198 F |
| 4,556,026 | 12/1985 | Masuda et al. | 123/198 F |

FOREIGN PATENT DOCUMENTS

| | | | |
|---|---|---|---|
| 637117 | 2/1962 | Canada | 123/192 B |
| 57-338 | 1/1982 | Japan . | |
| 58-4221 | 1/1983 | Japan . | |
| 2100800 | 1/1983 | United Kingdom | 123/192 B |

Primary Examiner—Lazarus Ira S.
Attorney, Agent, or Firm—Gerald J. Ferguson, Jr.; James E. Bryan; Michael P. Hoffman

[57] ABSTRACT

A multiple-displacement engine which can be operated either in a full-displacement operation in which all the cylinders are operative or a two-cylinder operation in which only two of the cylinders are operative is provided with a balancer control device. The balancer control device comprises a balancer which is driven at the same rpm as the engine output shaft during the two-cylinder operation and reduces the primary vibration generating moment imparted to the engine structure due to explosion, an engine load sensor for detecting engine load, an engine rpm sensor for detecting the engine speed and a balancer changing mechanism which changes the vibration generating moment of the balancer according to the operating condition of the engine so that the vibration generating moment of the balancer approximates the primary component of the vibration generating moment of the engine structure due to explosion thereby suppressing the primary vibration generating moment of the engine structure over the entire operating range during two-cylinder operation.

16 Claims, 16 Drawing Figures

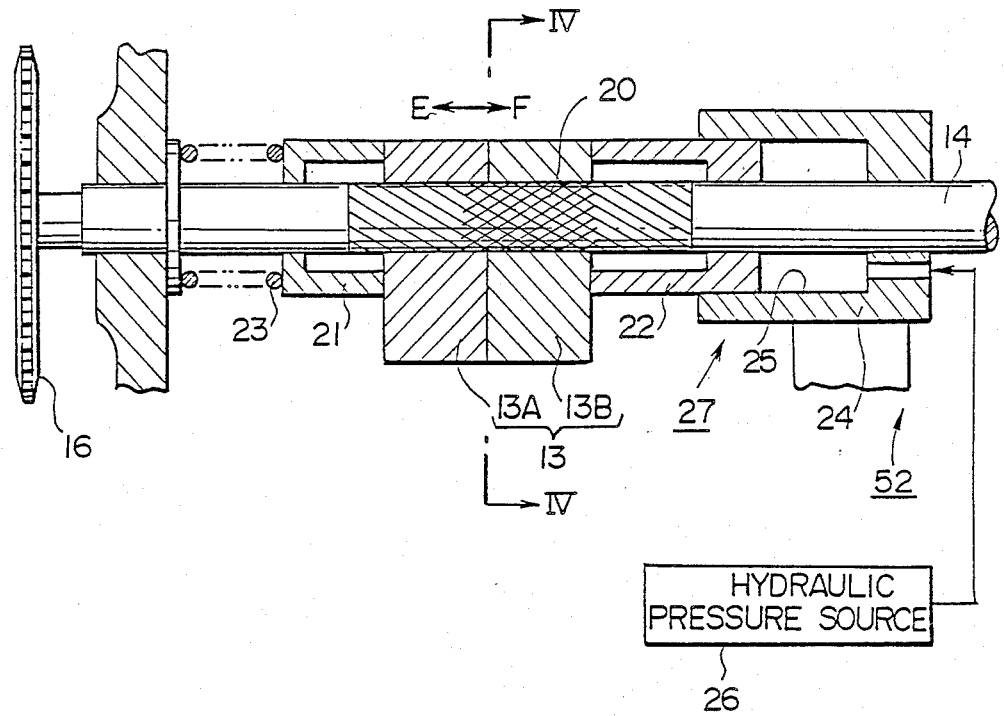
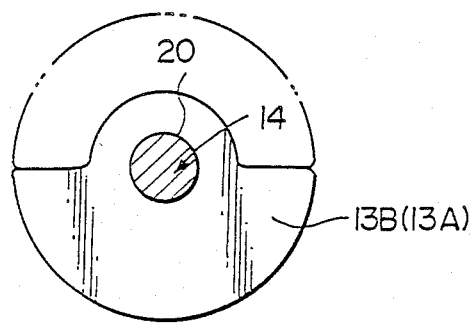

BALANCER CONTROL DEVICE FOR MULTIPLE-CYLINDER FOUR-CYCLE ENGINE

BACKGROUND OF THE INVENTION

1. Field of the Invention

This invention relates to a balancer control device for a four-cycle multiple-cylinder engine, and more particularly to a balancer control device for a four-cycle multiple-cylinder engine which can be operated in a state in which only two of the cylinders are operative.

2. Description of the Prior Art

There has been known a multiple-displacement engine which can be operated either in a full-displacement mode or in a partial-displacement mode according to the operating condition of the engine. Generally, in engines of this kind, fuel supply to a part of the cylinders is cut to make these cylinders inoperative (the partial-displacement mode) when the engine is operated under light load. (See, Japanese Unexamined Patent Publication No. 57(1982)-338, for example.)

In a multiple-displacement engine in which two cylinders are operated in the partial-displacement mode so that the power stroke of one cylinder occurs with a crank angle phase difference of 360° with respect to the power stroke of the other cylinder, a large primary vibration generating moment is generated in the engine structure due to torque fluctuation caused by explosion in the operative cylinders, thereby lowering the driving comfort.

The present state of the art is disclosed in Japanese Unexamined Patent Publication No. 57(1982)-338, Japanese Patent Publication No. 58(1983)-4221, U.S. Pat. No. 4,337,740, U.S. patent application Ser. No. 643,146 now U.S. Pat. No. 4,556,026 and Japanese Unexamined Utility Model Publication No. 58(1983)-49047.

SUMMARY OF THE INVENTION

In view of the foregoing observations and description, the primary object of the present invention is to provide a balancer control device for a multiple-cylinder engine operable in two-cylinder operation in which primary vibration generating moment imparted to the engine structure due to torque fluctuation during two-cylinder operation can be smoothed out, whereby the driving comfort during two-cylinder operation can be improved.

The balancer control device in accordance with the present invention comprises a balancer which is driven at the same rpm as the engine output shaft during two-cylinder operation and reduces the primary vibration generating moment imparted to the engine structure due to explosion, an engine load detecting means for detecting engine load, an engine rpm detecting means for detecting the engine speed and a balancer changing means which changes the vibration generating moment of the balancer according to the operating condition of the engine so that the vibration generating moment of the balancer approximates the primary component of the vibration generating moment of the engine structure due to explosion thereby suppressing the primary vibration generating moment of the engine structure over the entire operating range during two-cylinder operation.

Now, the principle of operation of the balancer control device of the present invention will be described in detail, hereinbelow.

By rotating a balancer having an eccentric weight at the same speed as the crankshaft in a predetermined phase, the primary component of the vibration generating moment of the engine structure due to explosion in the operative cylinders during two-cylinder operation can be reduced. On the other hand, the vibration generating moment of the engine structure due to explosion which changes depending on engine load and the vibration generating moment of the balancer which changes depending on the angular velocity do not coincide with (balance) each other over the entire two-cylinder operating range of the engine.

When depicting a moment curve of an engine in two-cylinder operation in which the power stroke of one cylinder occurs with a crank angle phase difference of 360° with respect to the power stroke of the other cylinder, there is obtained a vibration generating moment curve such as shown by the solid line La in FIG. 7 in which the vibration generating moment fluctuates by a large amount with a period of 360° since the vibration generating moment of the engine structure due to explosion is generated with a period of 360°. When extracting the primary component of the vibration generating moment due to explosion (the primary vibration generating moment) from the vibration generating moment curve La of FIG. 7, there is obtained a primary vibration generating moment curve Lc (solid line) shown in FIG. 6 having a sine component and a cosine component. Accordingly, by mounting on the engine a balancer generating a vibration generating moment equal to the primary vibration generating moment and rotating it in a predetermined crank angle phase, the primary vibration generating moment due to explosion can be offset by the vibration generating moment of the balancer (the vibration generating moment curve Ld shown by the dotted line in FIG. 6). When such a balancer is mounted on an engine in which the primary vibration generating moment due to torque fluctuation is large as shown by the vibration generating moment curve La of FIG. 7, the vibration generating moment characteristics of the engine are changed to those shown by the dotted line Lb in FIG. 7.

However, since the vibration generating moment due to explosion depends upon the engine load while the vibration generating moment of the balancer depends upon the angular velocity as described above, the two vibration generating moments coincide with each other only in a particular operating condition (at a particular engine rpm and under particular engine load) if the mass of the balancer and the rotational radius of the center of gravity of the balancer are both fixed at particular values. Therefore, in order to effectively reduce the primary vibration generating moment due to explosion by the vibration generating moment of the balancer over the entire two-cylinder operation range, at least one of the mass of the balancer and the rotational radius of the center of gravity of the balancer must be changed according to the operating condition of the engine so that the vibration generating moment of the balancer approximates the primary vibration generating moment due to explosion as far as possible. That is, the vibration generating moment of the balancer depends upon the centrifugal force of the same and accordingly can be changed by changing at least one of the mass of the balancer and the rotational radius of the center of the gravity of the same, which are proportional constants of the centrifugal force of the balancer (centrifugal force F of the balancer $=mr\omega^2$, m being the mass of the balancer, r being the rotational radius of the same and ω being the angular velocity).

Now, there will be described a method of approximating the vibration generating moment of the balancer to the primary vibration generating moment due to explosion over the entire two-cylinder operation range by changing the rotational radius r of the mass of the balancer with the mass m of the balancer fixed.

A balancer having a particular mass m and a particular rotational radius r is first assumed. Then there is identified a matching point at which the vibration generating moment of the balancer and the primary vibration generating moment due to explosion coincide with each other. The engine speed N and the engine load (the average effective pressure) Pe at the matching point will be denoted by Nm.p. and Pem.p., hereinbelow. In this particular case, it is assumed that the vibration generating moment of the balancer and the primary vibration generating moment due to explosion coincide with each other, i.e., that the primary vibration generating moment can be completely removed by the vibration generating moment of the balancer when the engine speed N is the maximum rpm (2500 rpm) in two-cylinder operation (See FIG. 11) and the average effective pressure (engine load) Pe is 4.0 kg/cm². That is, it is assumed that Nm.p. is 2500 rpm and Pem.p. is 4.0 kg/cm².

Values of the torque harmonic coefficients of the engine are obtained based on the engine data. The torque harmonic coefficients of the vibration generating moment due to explosion are substantially independent of the engine speed. Therefore, values of the cosine and sine torque harmonic coefficients $a_1$, $b_1$, $a_2$ and $b_2$ at 1500 rpm are obtained here based on the engine data and the values are considered to be values of the torque harmonic coefficients $a_l$, $b_1$, $a_2$ and $b_2$ at 2500 rpm. They are shown in FIG. 8. In the cosine and sine torque harmonic coefficients, the secondary components $a_2$ and $b_2$ are very small as compared with the primary components $a_1$ and $b_1$. Therefore, the secondary components $a_2$ and $b_2$ are neglected and the primary torque harmonic coefficients Th1 is represented as follows.

$$Th1 = \sqrt{a_1^2 + b_1^2} = C1 \cdot Pe + C2$$

C1 and C2 are respectively 0.79 and 1.8 in this particular engine. This is shown by line Le in FIG. 8. Based on the line Le, the primary torque harmonic coefficient Th1 for a given average effective pressure Pe can be obtained. For example, the primary torque harmonic coefficient Th1m.p. at the matching point is 4.96 kg/cm² when the average effective pressure Pe at the matching point (Pem.p.) is 4.0 kg/cm².

Accordingly, a characteristic curve Lf as shown in FIG. 9 is obtained when the ratios Th1m.p./Th1 (=Th1m.p./(C1·Pe+C2) which is equal to 4.96/(0.79·Pe+1.8) as for this example) of the primary torque harmonic coefficient Th1m.p. (4.96 kg/cm²) at the matching point to the primary torque harmonic coefficients Th1 (=C1·Pe+C2) at various engine loads are represented in terms of % and are plotted while the engine load (average effective pressure) is changed with the engine speed N fixed at Nm.p. (=2500 rpm). The characteristic curve Lf shows that when the balancer is rotated at the preset speed (Nm.p.=2500 rpm), the vibration generating moment balances the primary vibration generating moment due to explosion at a point at which the average effective pressure Pe is equal to Pem.p. (4.0 kg/cm²), whereby the primary vibration generating moment is completely removed by the vibration generating moment of the balancer.

A characteristic curve Lg as shown in FIG. 10 is obtained when the ratios (N/Nm.p.)² (which is equal to N²/2500² as for this example) of the vibration generating moments at various engine speeds to that at the preset engine speed (Nm.p.=2500 rpm) are represented in terms of % and are plotted while the engine speed is changed with the average effective pressure Pe fixed at Pem.p. (4.0 kg/cm²). The characteristic curve Lg shows that the primary vibration generating moment is completely removed by the vibration generating moment of the balancer when the engine speed N is Nm.p. (2500 rpm).

In order for the torque harmonic coefficient of the primary vibration generating moment due to explosion to balance with the torque harmonic coefficient of the vibration generating moment generated by the balancer with the vibration generating moment removing rate of 100%, the following formula must be satisfied.

$$Th1m.p./(C1 \cdot Pe + C2) = (Nm.p./N)^2 \tag{1}$$

$$[4.96/(0.79Pe + 1.8) = (2500/N)^2]$$

The formula (1) can be rewritten as follows.

$$Pe = [Th1m.p. - C2(Nm.p./N)^2]/C1(Nm.p./N)^2 \tag{2}$$

$$[Pe = (4.96 - 1.8(2500/N)^2)/0.79(2500/N)^2]$$

A characteristic curve L1 as shown in FIG. 11 can be obtained from the formula (2). That is, in order to always completely remove the primary vibration generating moment due to explosion by the vibration generating moment of the balancer having the assumed mass m and the rotational radius r, the engine must be operated in the condition on the characteristic curve L1.

The characteristic curve on which the primary vibration generating moment due to explosion can be completely removed by the vibration generating moment of the balancer changes as follows as the rotational radius of the center of gravity of the balancer changes. When the rotational radius r of the center of gravity of the balancer is changed to X times the original value, the vibration generating moment of the balancer is multiplied by X and said formula (1) is rewritten as follows.

$$X \cdot Th1m.p./(C1 \cdot Pe + C2) = (Nm.p./N)^2 \tag{11}$$

$$[X \cdot 4.96/(0.79 \cdot Pe + 1.8) = (2500/N)^2]$$

That is, $$Pe = [Th1m.p. \cdot X - C2 \cdot (Nm.p./N)^2]/C1 \cdot (Nm.p./N)^2 \tag{11'}$$

$$[Pe = [4.96 \cdot X - 1.8 \cdot (2500/N)^2]/0.79 \cdot (2500/N)^2]$$

By substituting X=2, X=4 and X=8 into the formula (11'), the characteristic curves L2, L3 and L4 in FIG. 11 are obtained. That is, when the rotational radius r of the center of gravity of the balancer is multiplied by 2, 4 or 8, the engine must be operated in the condition on the characteristic curve L2, L3 or L4 in order to always completely remove the primary vibration generating moment due to explosion by the vibration generating moment of the balancer.

Similarly, by substituting $X=\frac{1}{2}$, $X=\frac{1}{4}$ and $X=\frac{1}{8}$ into the formula (11') the characteristic curves L5, L6 and L7 are obtained.

Assuming that the two-cylinder operation range is the range indicated at A in FIG. 11, the rotational radius of the balancer must be changed according to the operating condition of the engine along one of the characteristic curves L1 to L7 in order to sufficiently remove the primary vibration generating moment by the vibration generating moment of the balancer.

FIG. 12 schematically shows a balancer 13 comprising a pair of semicircular balancer pieces 13A and 13B which are rotatable with respect to each other to change the included angle $\theta$ therebetween from 0° to 180°. The distance R between the rotational center of the balancer 13 and the center of gravity G of the same, i.e., the rotational radius of the center of gravity, is changed with the included angle $\theta$. Assuming that the balancer 13 is used as the balancer, the relation between the included angle $\theta$ and the characteristic curves L1 to L7 will be described hereinbelow.

The relations between the ratio R/R1 of the rotational radius R of the center of gravity of the overall balancer 13 to the rotational radius R1 of the center of gravity g of each balancer piece (13A or 13B) and the included angle $\theta$ between the balancer pieces 13A and 13B is represented by the following formula.

$$R/R1 = \sin\theta/2 \text{ or } \theta = 2\sin^{-1} R/R1 \quad (3)$$

The characteristic curve represented by the formula (3) is shown in FIG. 13.

In the characteristic curves L1 to L7 in FIG. 11, the characteristic curve L4 corresponds to the largest rotational radius of the center of gravity of the balancer. Accordingly, the rotational radius ratio R/R1 for the characteristic curve L4 is set at 1 or the maximum. That is, the included angle $\theta$ is set at 180° (from the formula (3)).

The rotational radius R for the characteristic curve L3 is half of that for the characteristic curve L4 as described above. Therefore, the rotational radius ratio R/R1 for the characteristic curve L3 is twice as large as that for the characteristic curve L4. That is, the rotational radius ratio R/R1 for the characteristic curve L3 should be $\frac{1}{2}$. Accordingly, the included angle $\theta$ should be 60° (from the formula (3)).

In a similar manner, the rotational radius ratio R/R1 and the included angle for each characteristic curve are obtained as follows.

L2 ... R/R1=0.25, $\theta=30°$
L1 ... R/R1=0.125, $\theta=14.4°$
L5 ... R/R1=0.0625, $\theta=7.2°$
L6 ... R/R1=0.03125, $\theta=3.6°$
L7 ... R/R1=0.015625, $\theta=1.8°$ Thus, in the case of the balancer 13, by controlling the included angle $\theta$ according to the operating condition of the engine in the manner described above, the primary vibration generating moment due to explosion can be effectively removed by the vibration generating moment of the balancer over the entire two-cylinder operation range.

BRIEF DESCRIPTION OF THE DRAWINGS

FIG. 3 is a fragmentary cross-sectional view of the balancer employed in the balancer control device of FIG. 1, FIG. 4 is a cross-sectional view taken along line IV—IV in FIG. 3.

DESCRIPTION OF THE PREFERRED EMBODIMENTS

Figure 1:
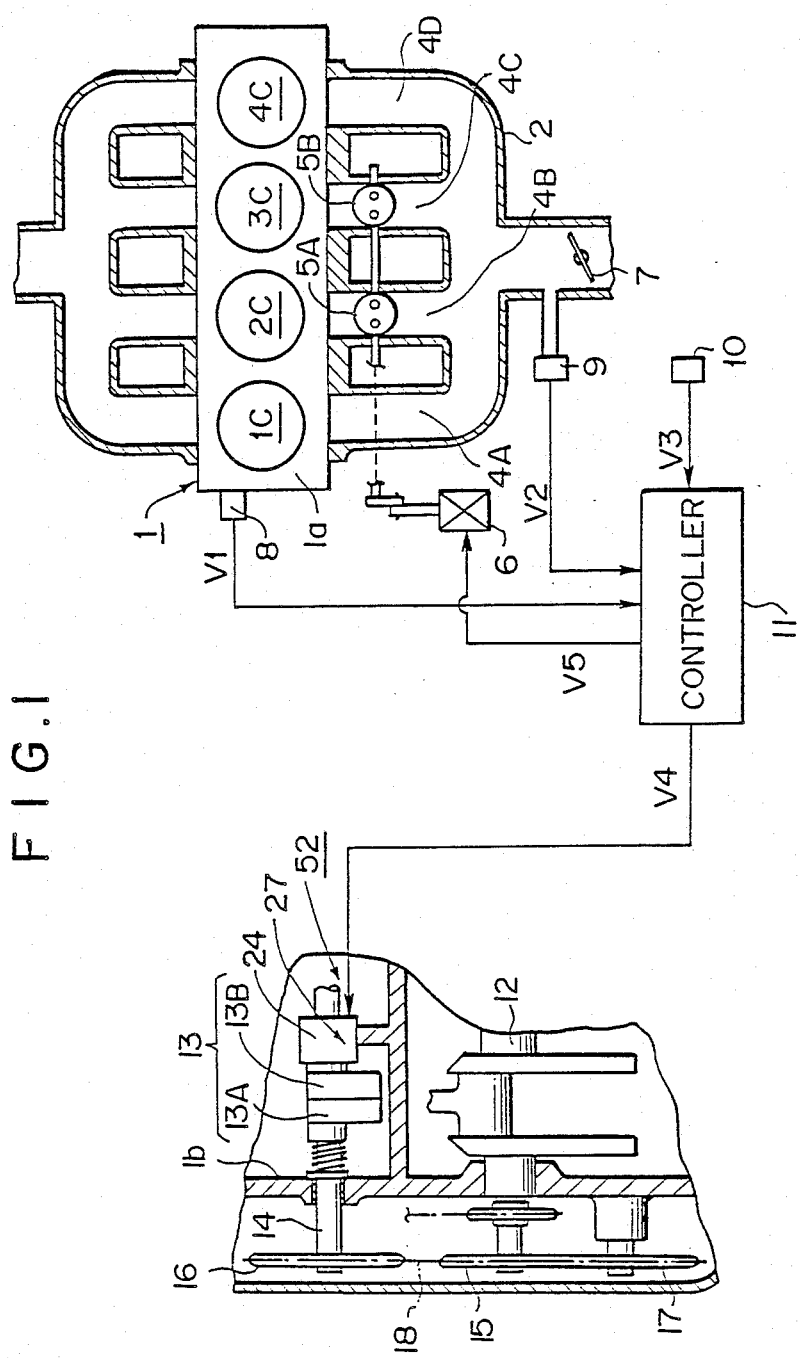
FIG. 1 is a view schematically showing a multiple-displacement engine provided with a balancer control device in accordance with an embodiment of the present invention.

The engine shown in FIG. 1 has four cylinders 1C to 4C and is provided with a balancer control device in accordance with an embodiment of the present invention. Normally, all the cylinders 1C to 4C of the engine are operated but two of them are made inoperative in a particular operating range to be described later. The balancer control device of the present invention acts when the engine operates in two-cylinder operation, that is, when two of the cylinders are made inoperative.

Figure 2:
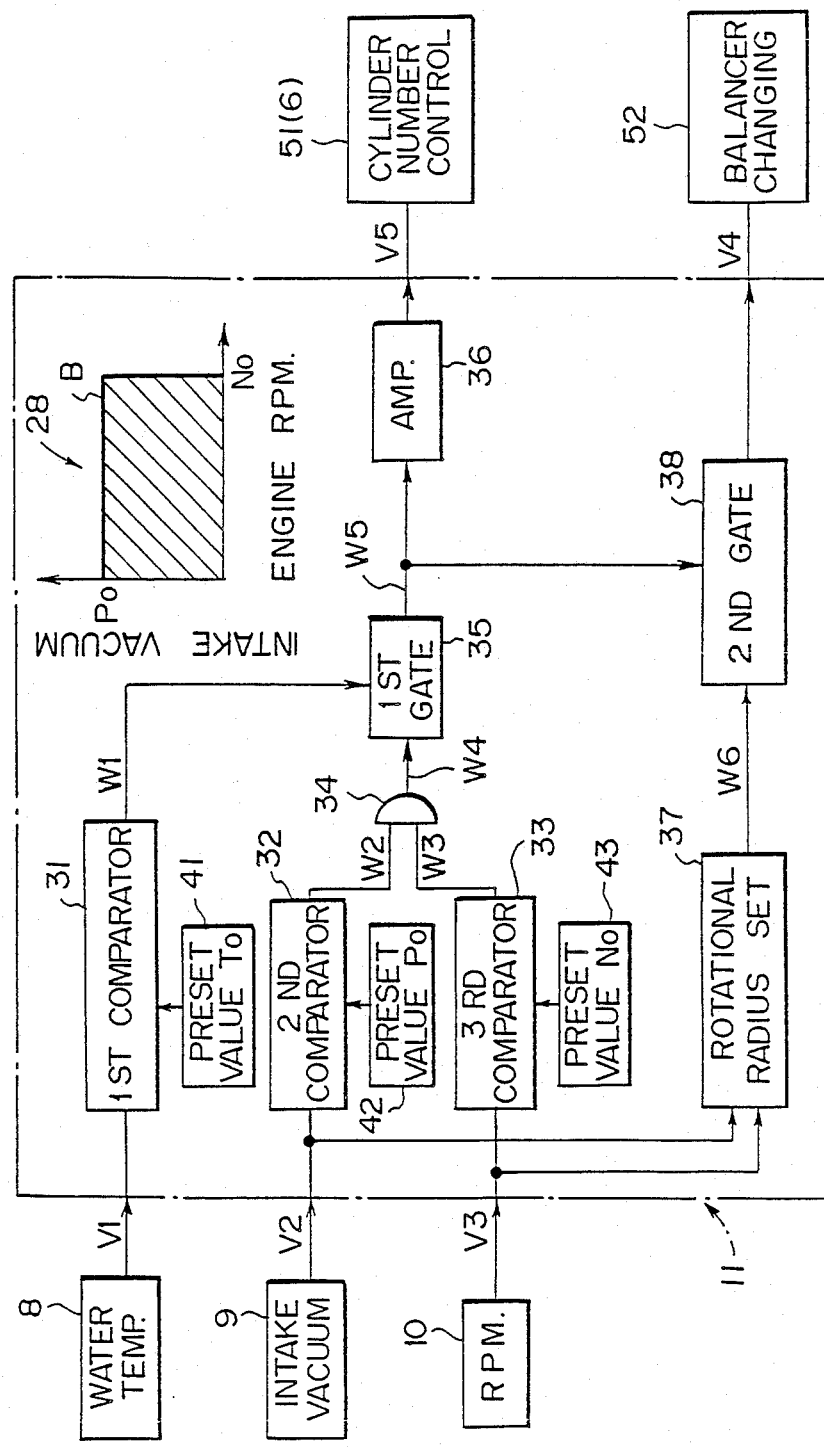
FIG. 2 is a block diagram showing control of the controller employed in the balancer control device of FIG. 1.
Figure 11:
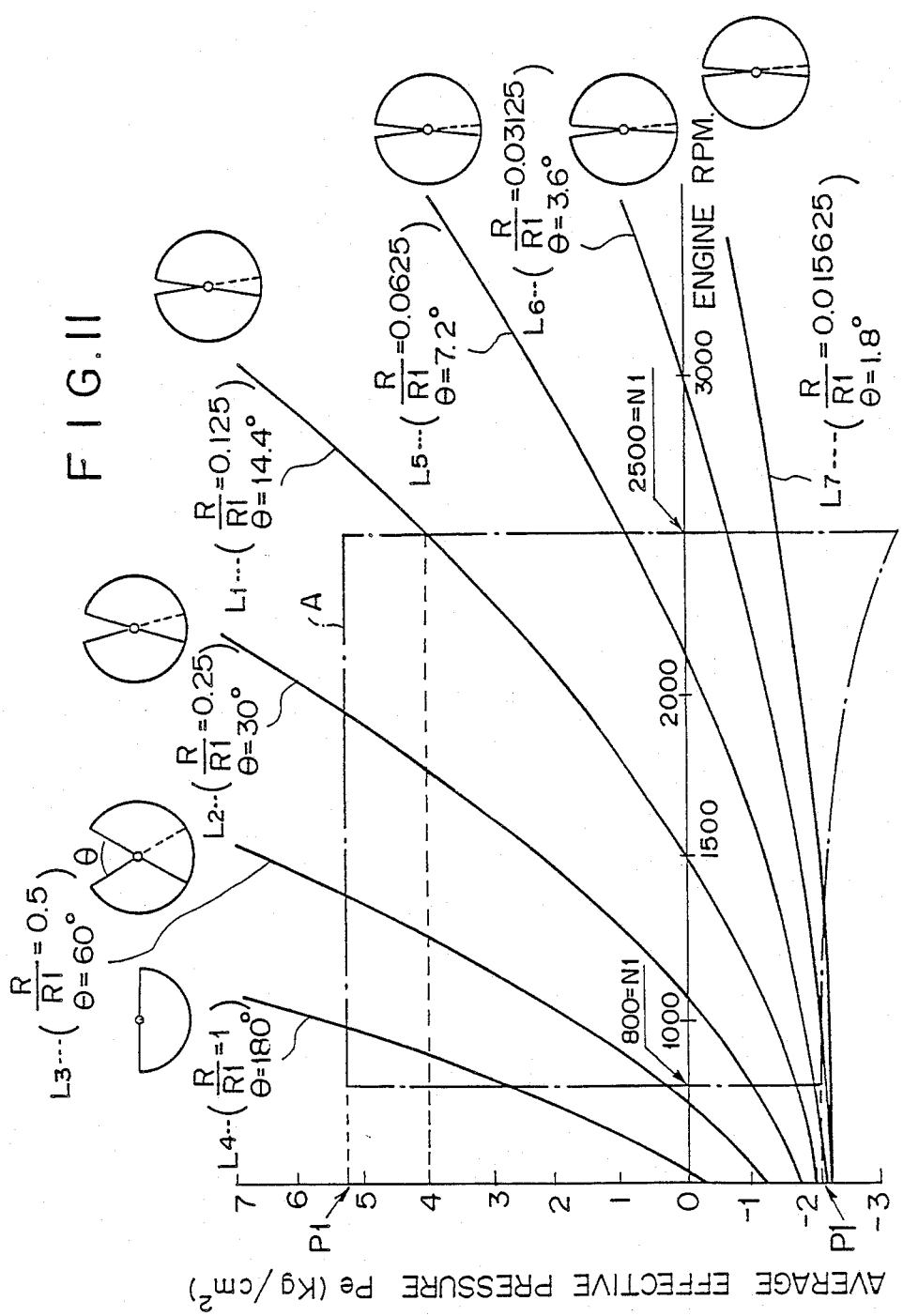
FIG. 11 is a graph showing the relation between the rotational radius of the center of gravity of the balancer and the characteristic curve along which the primary vibration generating moment can be completely removed by the vibration generating moment of the balancer.

That is, the engine shown in FIG. 1 is a multiple-displacement engine in which two particular cylinders 2C and 3C are made inoperative when the operating condition of the engine is in a low speed light load range or deceleration range in which the average effective pressure is between a positive preset value P1 and a negative preset value P'1 and the engine speed is between a first preset value N1 (=2500 rpm) and a second preset value N'1 (idling speed=800 rpm). (The two-cylinder operation range A in FIG. 11) The intake manifold 2 for supplying air-fuel mixture to the cylinders 1C to 4C is divided into first to fourth intake passages 4A to 4D respectively communicated with the first to fourth cylinders 1C to 4C. The second and third intake passages 4B and 4C respectively communicated with the second and third cylinders 2C and 3C are provided with shutter valves 5A and 5B. The shutter valves 5A and 5B are opened and closed in unison by an actuator 6 which may be a pulse motor, for instance. The actuator closes both the shutter valves 5A and 5B to make the second and third cylinders 2C and 3C inoperative when it receives a cylinder number reduction signal V5 from a controller 11 to be described later in conjunction with FIG. 2. In this embodiment, the engine is operated in two-cylinder operation only in a range B defined by a preset engine speed No and a preset intake vacuum Po shown in a map 28 in FIG. 2.

An intake vacuum sensor 9 is provided in the intake manifold 2 downstream of a throttle valve 7 to detect load on the engine. A water temperature sensor 8 is provided beside the cylinder head 1a of the engine structure 1 and a rpm sensor 10 is attached to the distributor (not shown) to detect the engine speed. A water temperature signal V1 output from the water temperature sensor 8, an intake vacuum signal V2 output from the intake vacuum sensor 9 and a engine rpm signal V3 output from the rpm sensor 10 are input into the controller 11.

On the other hand, on the cylinder block 1b forming the engine structure 1 together with the cylinder head 1a is mounted a balancer shaft 14 having a balancer 13. To one end of the balancer shaft 14 is fixed a balancer sprocket 16. The crankshaft 12 of the engine is provided with a balancer sprocket driving sprocket 15 mounted on the free end thereof. The balancer sprocket 16 and the balancer sprocket driving sprocket 15 are drivingly connected with each other by a chain 18 so that the balancer shaft 14 is always rotated by rotational force of the crankshaft 12 at the same speed as the crankshaft 12.

Figure 12:
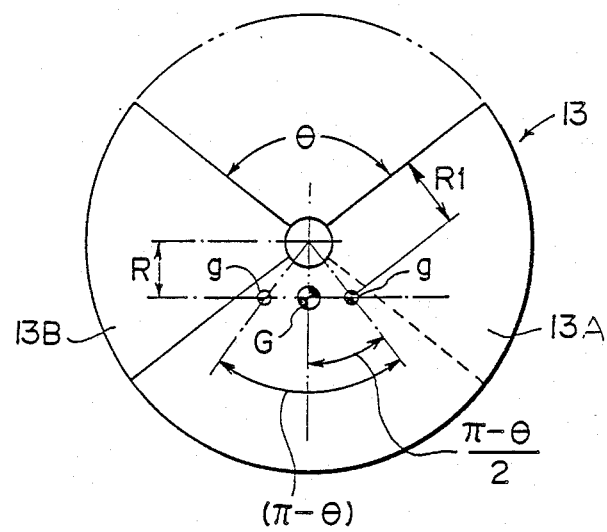
FIG. 12 is a view for illustrating the principle of operation of the balancer.
Figure 13:
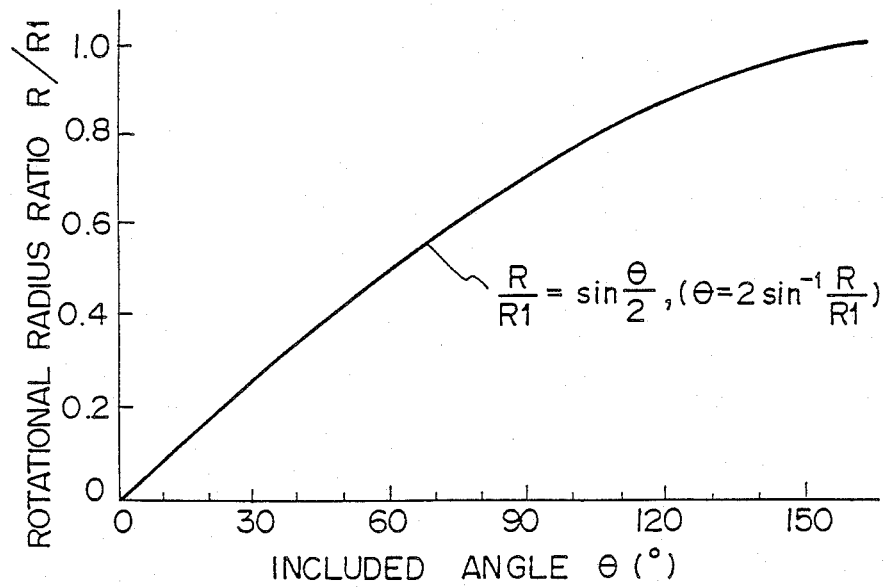
FIG. 13 is a graph showing the relation between the rotational radius ratio and the included angle of the balancer.

As shown in FIG. 3, the balancer shaft 14 is provided at an intermediate portion with double splines 20 having mutually intersecting helix angles. The balancer 13 comprises a pair of substantially semicircular balancer pieces 13A and 13B having a suitable mass as shown in FIG. 4 and is slidably engaged with the portion of the balancer shaft 14 provided with the double splines 20. The balancer 13 is sandwiched under pressure between a first retainer member 21 urged by a spring 23 and a second retainer member 22 inserted into a hydraulic pressure chamber 25 formed in a support member 24 to act as a piston rod, the first and second retainer members 21 and 22 being urged against the axially opposed sides of the balancer 13. Depending on the hydraulic pressure introduced into the hydraulic pressure chamber 25 from a hydraulic pressure source 26, the balancer pieces 13A and 13B are integrally moved back and forth in the directions of arrows E and F (FIG. 4). When the balancer pieces 13A and 13B are moved in the direction of the arrows E and F along the balancer shaft 14, they are rotated with respect to each other in opposite directions by virtue of the helix angles of the double splines 20, whereby the included angle $\theta$ therebetween is changed to change the rotational radius R of the center of gravity G of the overall balancer 13 as described above in conjunction with FIG. 12. That is, in this particular embodiment, the hydraulic driving mechanism 27 comprising the second retainer member 22, the support member 24 and the hydraulic pressure source 26 and the double splines 20 on the balancer shaft 14 forms a balancer adjustment means 52. The balancer adjustment means 52 is operative to control the included angle $\theta$ between the balancer pieces according to the operating condition of the engine only when the operating condition of the engine is in the two-cylinder operation range B shown in the map 28 in FIG. 2. Otherwise, the balancer adjustment means 52 is made inoperative. That is, when the operating condition of the engine is out of the two-cylinder operation range, the balancer 13 is moved toward the arrow F under the force of the spring 23 to nullify the included angle $\theta$ between the balancer pieces 13A and 13B. When the included angle $\theta$ is zero, the balancer 13 has no eccentric weight and accordingly generates no vibration generating moment.

The controller 11 comprises a first comparator 31 which compares the actual engine coolant temperature Tw (See FIG. 5) represented by the water temperature signal V1 output from the water temperature sensor 8 with a preset coolant temperature value To and outputs a warm-up completion signal W1 when the former is not lower than the latter, a second comparator 32 which compares the actual intake vacuum Pb (See FIG. 5) represented by the intake vacuum signal V2 output from the intake vacuum sensor 9 with a preset intake vacuum Po and outputs a cylinder number reduction intake vacuum signal W2 when the former is not higher than the latter, and a third comparator 33 which compares the actual engine speed Na (See FIG. 5) represented by the engine rpm signal V3 output from the rpm sensor 10 with a preset engine speed No and outputs a cylinder number reduction rpm signal W3 when the former is not higher than the latter. The outputs of the second and third comparators 32 and 33 are input into an AND circuit 34 which delivers a cylinder number reduction range signal W4 to a first gate circuit 35 when both the cylinder number reduction intake vacuum signal W2 and the cylinder number reduction rpm signal W3 are input thereinto, that is, when the operating condition of the engine is in the two-cylinder operation range B shown in FIG. 2. The first gate circuit 35 outputs a cylinder number reduction control signal W5 when both the cylinder number reduction range signal W4 and the warm-up completion signal W1 are input thereinto. The cylinder number reduction control signal W5 is amplified by an amplifier 36 and delivered to a cylinder number control means 51 (the actuator 6 in this particular embodiment) as the cylinder number reduction signal V5. Even if the operating condition is in the two-cylinder operation range B, the engine is operated in full-displacement operation while the engine is cold.

The controller 11 further comprises a rotational radius setting circuit 37 which receives the intake vacuum signal V2 and engine rpm signal V3, and delivers to a second gate circuit 38 a balancer adjustment signal W6 when the operating condition of the engine is in the two-cylinder operation range B. The balancer adjustment signal W6 is permitted to pass through the second gate circuit 38 only when the cylinder number reduction control signal W5 is output from the first gate circuit 35 (i.e., when the engine is operated in two-cylinder operation) and is delivered to the balancer adjustment means 52 as a hydraulic pressure control signal V4, thereby changing the rotational radius R of the center of gravity G of the balancer 13 according to the operating condition of the engine as described above.

Figure 5:
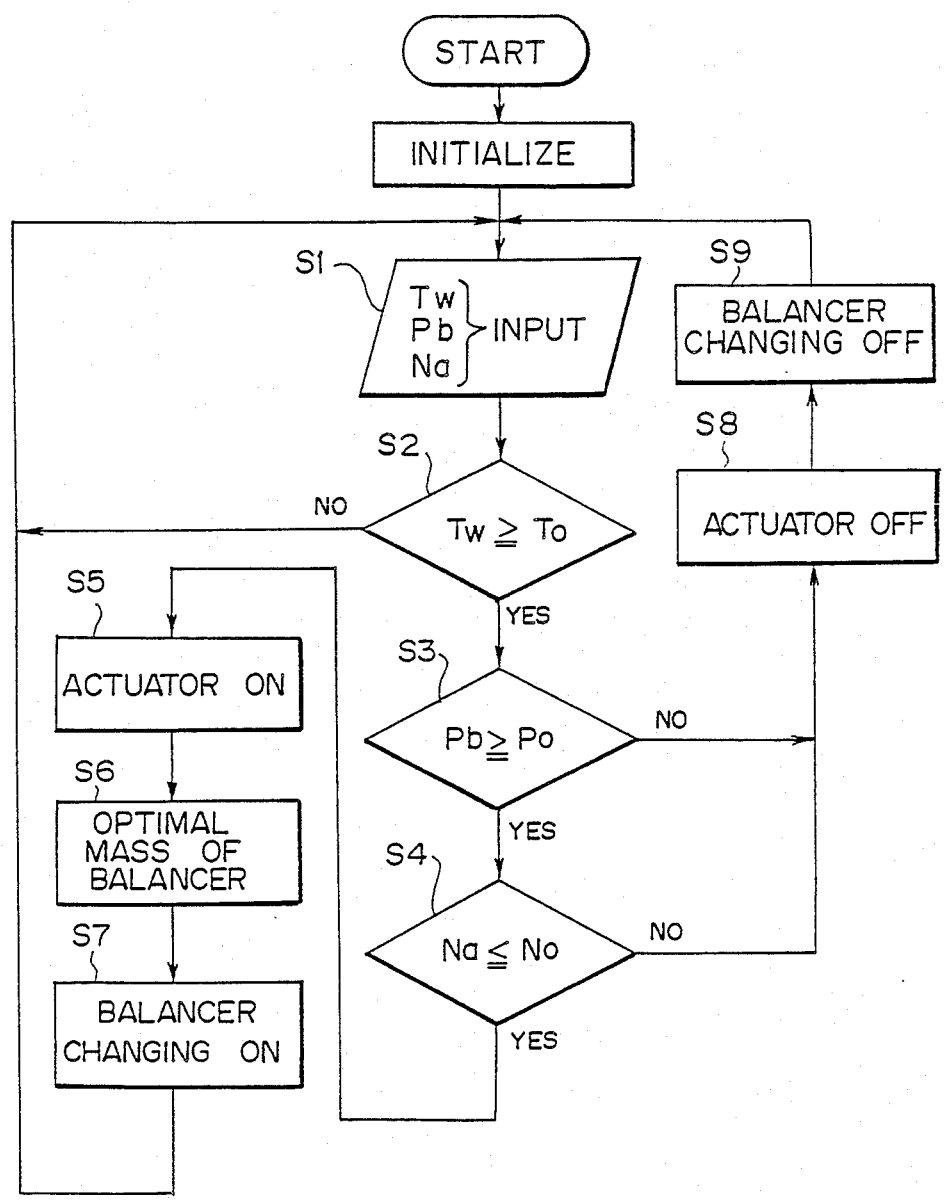
FIG. 5 is a flow chart showing control of the controller employed in the balancer control device of FIG. 1.
Figure 6:
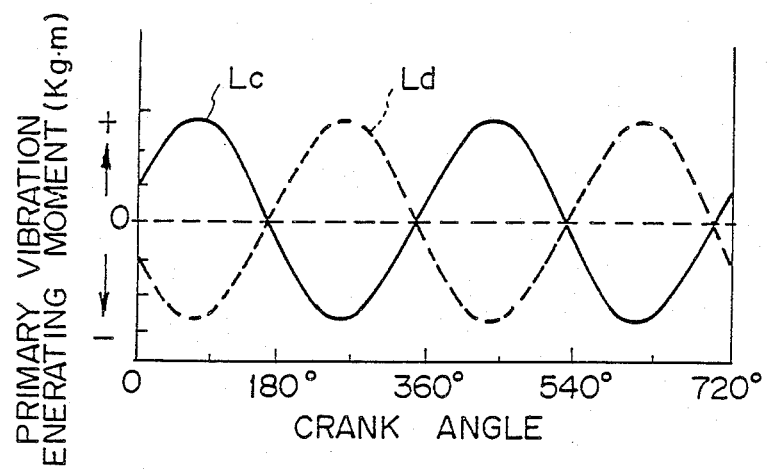
FIG. 6 is a view showing a primary vibration generating moment curve of an engine operated in the two-cylinder operation.
Figure 7:
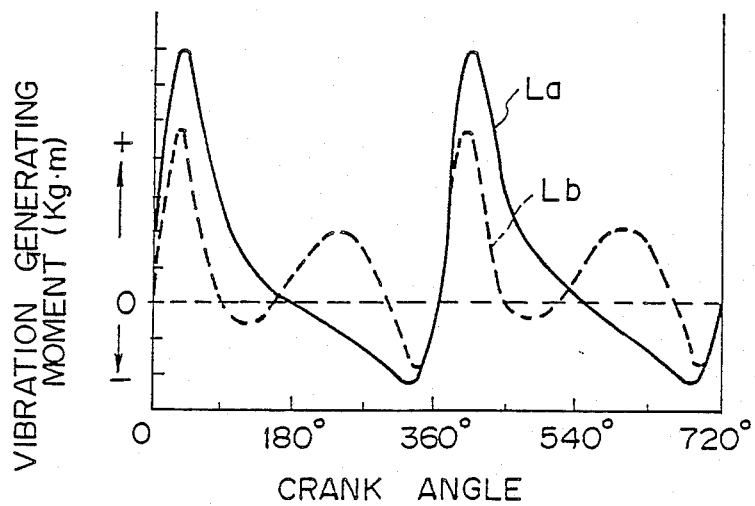
FIG. 7 is a graph showing the difference in the primary vibration generating moment before and after removal of the primary vibration generating moment by the balancer.
Figure 8:
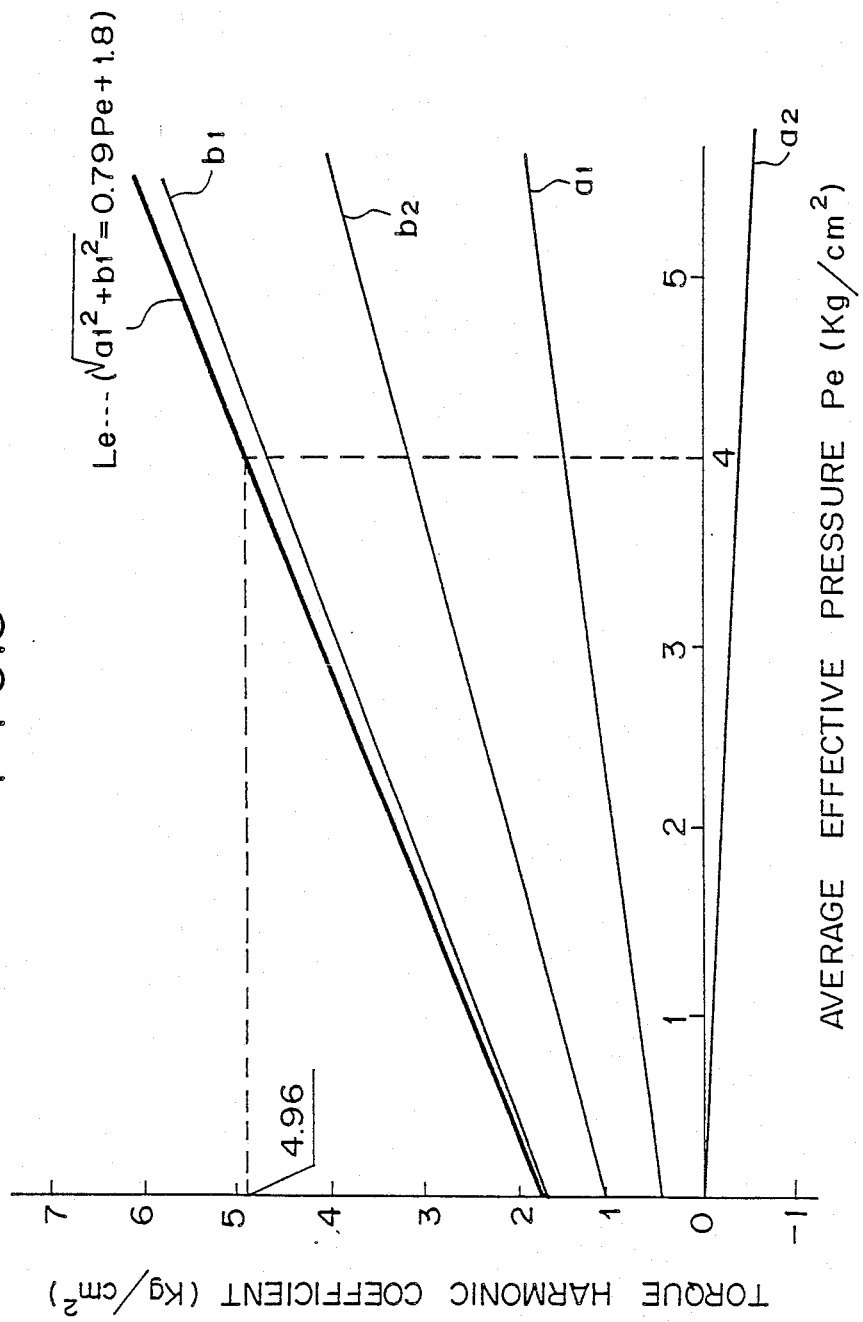
FIG. 8 is a graph showing torque harmonic coefficients.
Figure 9:
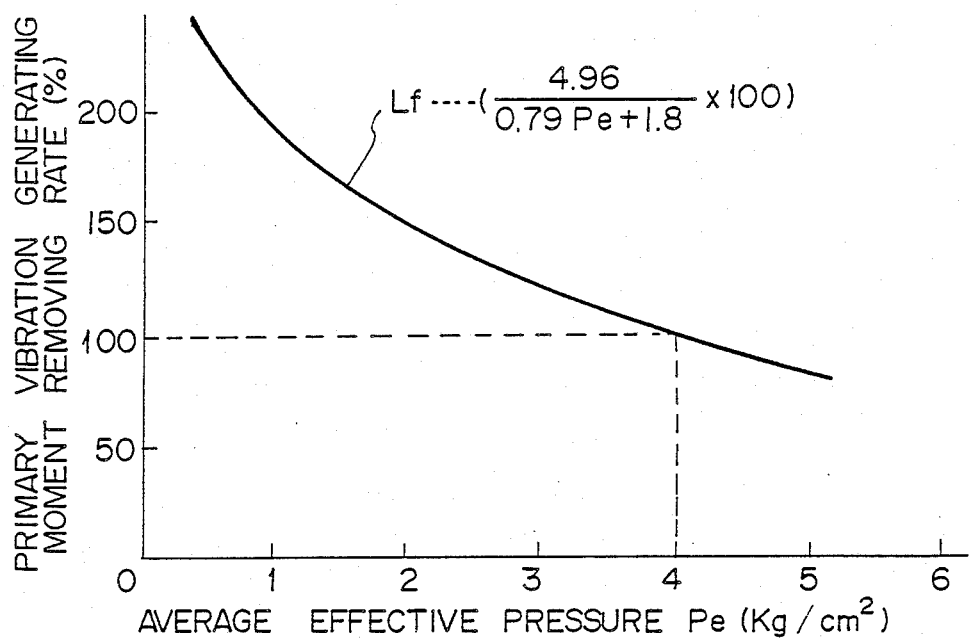
FIGS. 9 and 10 are views showing change in the primary vibration generating moment in an engine.
Figure 10:
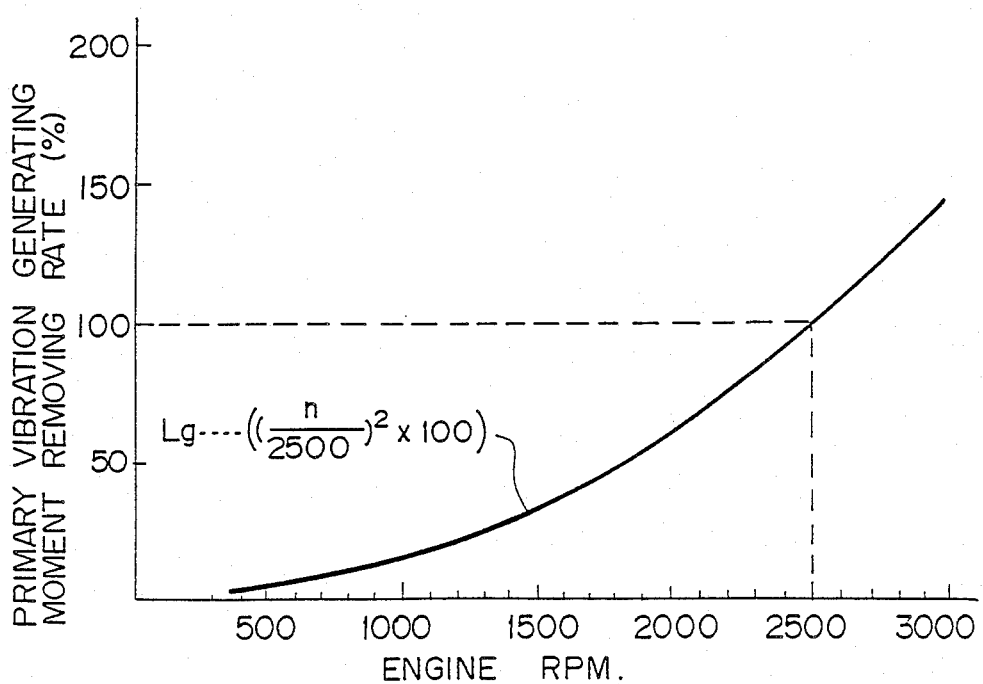

The operation of the controller 11 will be described in brief with reference to the flow chart shown in FIG. 5. After the engine is started in the full-displacement state, the controller first performs initializing. Then, in step S1, the Tw, the Pb and the Na are read. In step S2, the Tw is compared with the To, and when the latter is higher than the former, the controller 11 returns to the step S1 so that the full-displacement operation is continued irrespective of the Pb and the Na. In this case, the balancer 13 is rotated with the included angle $\theta$ kept at zero. On the other hand, when the Tw is not lower than To, the Pb is compared with the Po in step S3. When it is not determined that the Pb is not lower than Po, the controller proceeds to step S8 and then to step S9 to continue the full-displacement operation by keeping the actuator 6 inoperative (the step S8) and to keep at zero the included angle $\theta$ of the balancer 13 (the step S9). When it is determined that the Pb is not lower than the Po in the step S3, the Na is compared with the No in step S4. When it is not determined that the Na is not higher than the No, the controller 11 proceeds to the step S8 and then to the step S9 to continue the full-displacement operation and to keep at zero the included angle $\theta$ of the balancer 13. On the other hand, when it is determined that the Na is not higher than the No, the actuator 6 is operated to make inoperative the second and third cylinders 2C and 3C, that is, the operating state of the engine is changed to the two-cylinder operation, in step S5. Then in step S6, the optimal included angle $\theta$ of the balancer 13 for the operating condition of the engine is read out from the map 28, and the hydraulic pressure control signal V4 according to the value of the included angle $\theta$ is delivered to the balancer adjustment means 52 in step S7, thereby controlling the included angle $\theta$ to the optimal value.

By thus controlling the included angle $\theta$ of the balancer 13, the primary vibration generating moment of the engine structure due to explosion can be substantially removed by the vibration generating moment of the balancer over the entire two-cylinder operation range.

Figure 14:
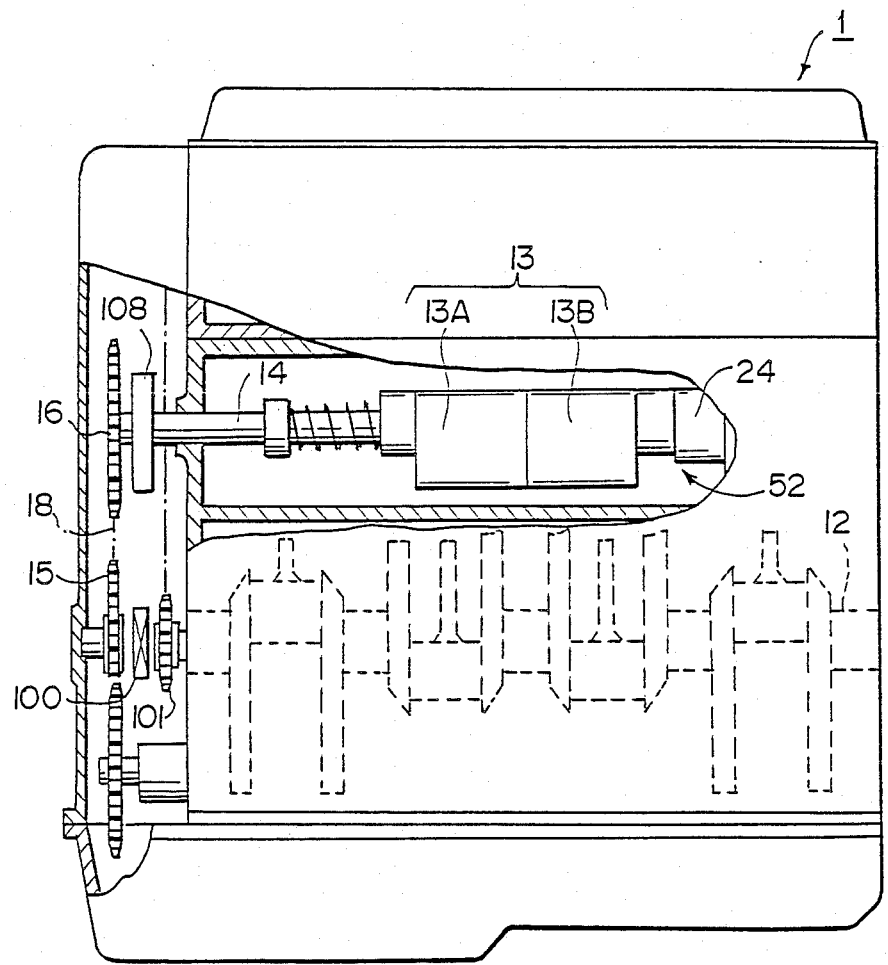
FIG. 14 is a fragmentary side view partly in cross-section of a multiple-displacement engine provided with a balancer control device in accordance with a modification of the balancer control device of FIG. 1.
Figure 15:
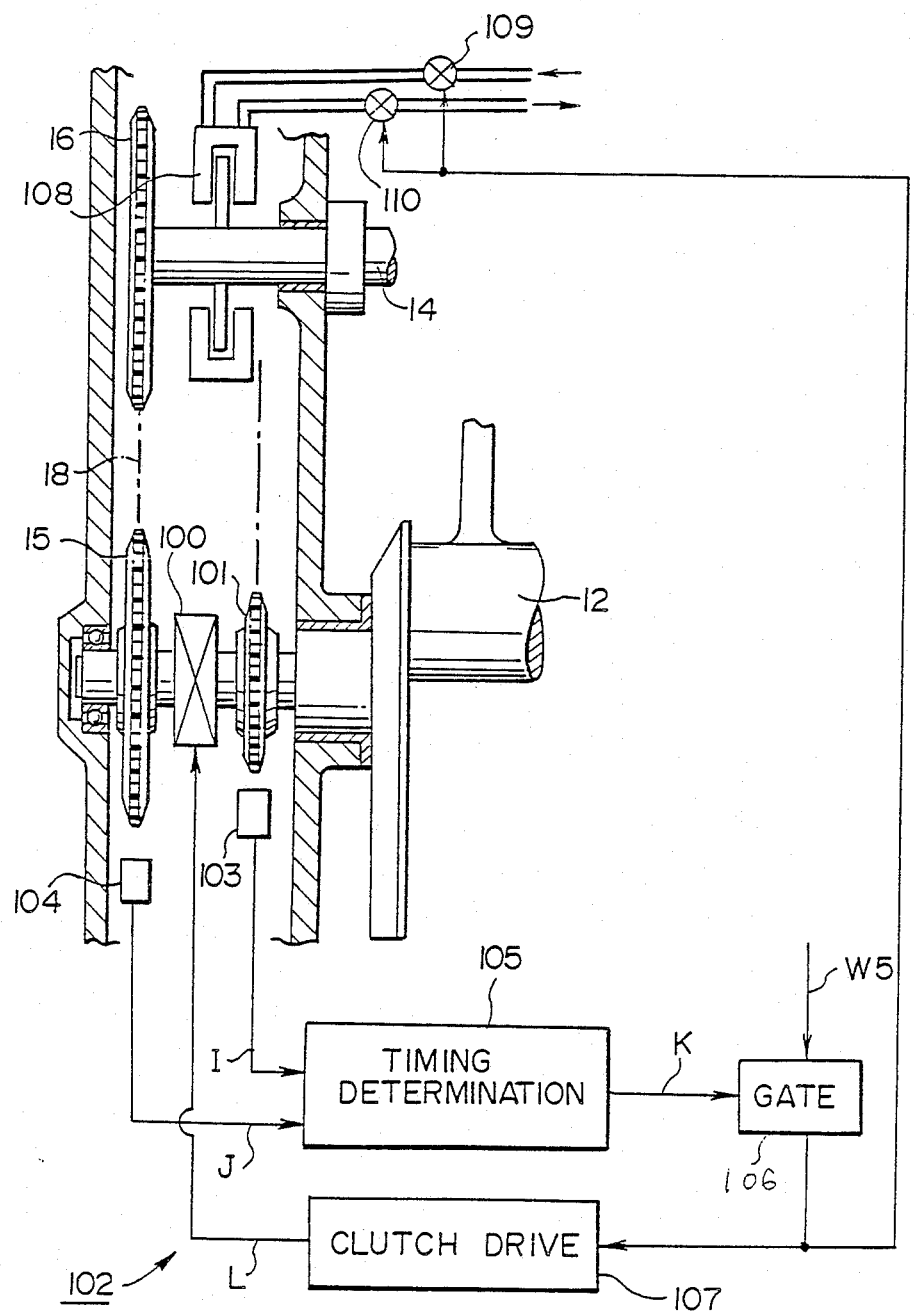
FIG. 15 is a view showing in more detail the engine of FIG. 14.

In the embodiment described above, the balancer shaft 14 is connected to the crankshaft 12 so that the balancer shaft 14 is always rotated together with the crankshaft 12 irrespective of whether or not the balancer 13 is required to generate a vibration generating moment to remove the relevant primary vibration generating moment, and during the full-displacement operation of the engine in which the balancer is not required to generate a vibration generating moment, the effect of the balancer 13 is canceled by nullifying the included angle $\theta$ of the balancer 13. However, as shown in FIGS. 14 and 15, the balancer shaft 14 may be connected to the crankshaft 12 by way of a clutch mechanism 100 which engages to drive the balancer shaft 14 when the balancer 13 is required to generate a vibration generating moment and otherwise disengages to release the balancer shaft 14. When the clutch mechanism 100 disengages, a retainer mechanism 108 holds the balancer shaft 14.

More particularly, as shown in FIG. 15, a sprocket 101 is fixed to the free end of the crankshaft 12 and is connected to the balancer sprocket driving sprocket 15 by way of an electromagnetic clutch 100. The clutch 100 is controlled by a balancer control circuit 102 which comprises a first pickup 103 for detecting the position of the sprocket 101, a second pickup 104 for detecting the position of the balancer sprocket driving sprocket 15, a timing determination circuit 105 which detects the phase relation between the crankshaft 12 and the balancer 13 based on signals from the first and second pickups 103 and 104, and outputs a gate opening signal K to a gate 106 when the crankshaft 12 and the balancer 13 assume a predetermined phase relation, and a clutch driving circuit 107 which receives said cylinder number reduction control signal W5 from the controller 11 shown in FIG. 2 and outputs a clutch engaging signal L to the electromagnetic clutch 100 when the gate 106 is opened. Thus, the electromagnetic clutch 100 is engaged at the predetermined time so that the balancer 13 is driven by the crankshaft 12 maintaining the predetermined phase relation thereto when the operating state of the engine is changed from the full-displacement state to the two-cylinder operation state.

When the operating state of the engine goes out of the two-cylinder operation range B, output of the cylinder number reduction control signal W5 from the controller 11 is interrupted so that the engine is operated in the full-displacement operation, and at the same time the electromagnetic clutch 100 is disengaged to release the balancer shaft 14 and the retainer mechanism 108 holds the balancer shaft 14. The retainer mechanism 108 is hydraulically driven. That is, a relief valve 109 is opened and a hydraulic valve 110 is closed in response to the cylinder number reduction control signal W5 to cause the retainer mechanism 108 to release the balancer shaft 14. When output of the cylinder number reduction control signal W5 is interrupted, the relief valve 109 is closed and the hydraulic valve 110 is opened to cause the retainer mechanism 108 to hold the balancer shaft 14, thereby stopping the balancer 13.

Figure 16:
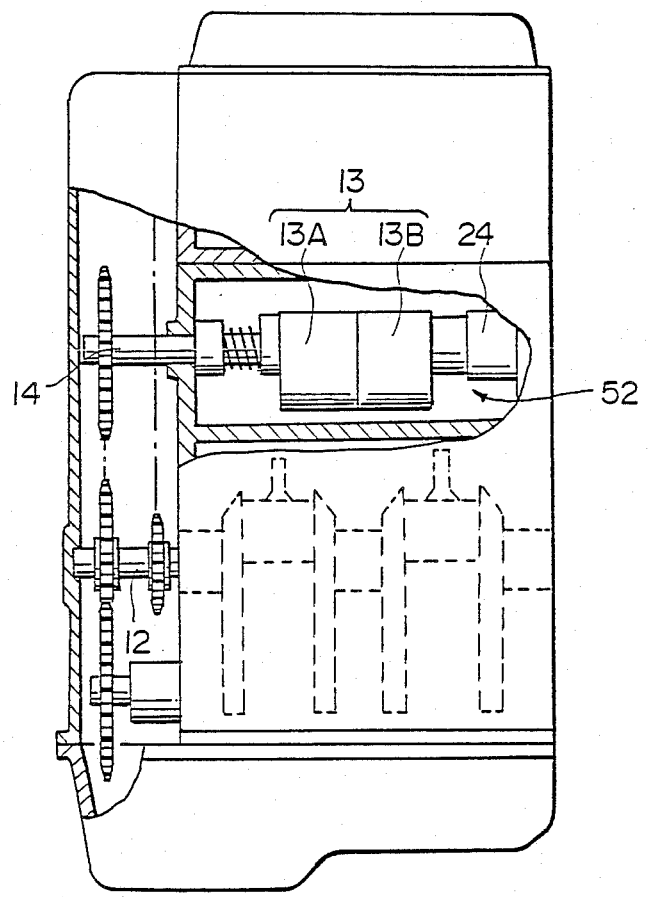
FIG. 16 is a side view partly in cross-section of a two-cylinder engine provided with a balancer control device in accordance with another embodiment of the present invention.

The balancer control device of the present invention can be applied also to a two-cylinder engine having only two cylinders which are always operative. In this case, the balancer shaft 14 is connected to the crankshaft 12 to be always rotated together with the crankshaft 12 as shown in FIG. 16.

We claim:

1. In a multiple-cylinder four-cycle engine which can be operated in two-cylinder operation in which two cylinders are operated so that the power stroke of one cylinder occurs with a crank angle phase difference of 360° with respect to the power stroke of the other cylinder, a balancer control device comprising a balancer which is driven during the two-cylinder operation of the engine to generate a primary vibration generating moment which reduces the primary vibration generating moment imparted to the engine structure due to explosion during the two-cylinder operation, an engine load detecting means for detecting engine load, an engine rpm detecting means for detecting the engine speed and a balancer changing means which changes the primary vibration generating moment of the balancer according to the operating condition of the engine so that the primary vibration generating moment of the balancer approximates the primary vibration generating moment of the engine structure due to explosion thereby suppressing the primary vibration generating moment of the engine structure over the entire operating range during the two-cylinder operation.

2. A balancer control device as defined in claim 1 in which said balancer is provided on a balancer shaft extending in parallel to the crankshaft of the engine and is rotated at the same speed as the crankshaft, and said balancer changing means reduces the product of the rotational radius of the center of gravity of the balancer and the mass of the balancer for a given engine load with increase in engine speed and increases the same for a given engine speed with increase in the engine load.

3. A balancer control device as defined in claim 2 in which said balancer comprises a plurality of balancer pieces which are mounted on the balancer shaft and the centers of gravity of which are deviated from the axis of the balancer shaft, and said balancer changing means is arranged to rotate at least one of the balancer pieces about the axis of the balancer shaft.

4. A balancer control device as defined in claim 3 in which said at least one balancer piece to be rotated by the balancer changing means is provided with splines and said balancer shaft is provided with splines which are engaged with the splines of the at least one balancer piece so that the at least one balancer piece is rotated about the axis of the balancer shaft by moving the balancer piece in the axial direction of the balancer shaft.

5. A balancer control device as defined in claim 4 in which said balancer comprises a pair of balancer pieces respectively provided with splines, and said balancer shaft is provided with first and second splines the helix angles of which intersect with each other, the first splines of the balancer shaft being engaged with the splines of one of the balancer pieces and the second splines of the balancer shaft being engaged with the splines of the other balancer pieces so that the balancer pieces are rotated about the axis of the balancer shaft in opposite directions by moving them in the axial direction of the balancer shaft.

6. A balancer control device as defined in claim 2 in which said balancer changing means changes the product of the center of gravity of the balancer and the mass of the balancer to satisfy the following formula;

$$Pe = [Thlm.p. \cdot X - C2 \cdot (Nm.p./N)^2]/C1 \cdot (Nm.p./N)^2$$

wherein Pe represents the average effective pressure, N represents the engine speed, Nm.p. represents a preset engine speed, Thlm.p. represents the primary torque harmonic coefficient under a preset average effective pressure, C1 represents the rate of change in the torque harmonic coefficient with change in the average effective pressure, and C2 represents the value of the torque harmonic coefficient when the average effective value is zero.

7. A balancer control device as defined in claim 1 in which said engine has only two cylinders and said balancer is normally driven.

8. A balancer control device as defined in claim 1 in which said engine is a four-cylinder in-line engine two of the four cylinders of which are made inoperative in predetermined operating condition of the engine, and said balancer changing means changes at least one of the rotational radius of the center of gravity of the balancer or the mass of the balancer.

9. A balancer control device as defined in claim 8 further comprising a clutch mechanism which engages during two-cylinder operation of the engine to drivingly connect the balancer with the crankshaft and disengages to disconnect the balancer from the crankshaft during full-displacement operation of the engine.

10. A balancer control device as defined in claim 9 further comprising a retainer means which holds the balancer stationary when said clutch mechanism disengages.

11. A balancer control means as defined in claim 8 in which the rotational radius of the center of gravity of the balancer is nullified while the engine is operated in the full-displacement state.

12. A balancer mechanism for an engine comprising a balancer which is supported for rotation about a rotational axis in parallel to the output shaft of the engine and has a center of mass at a position deviated from the rotational axis, the balancer comprising at least one balancer piece having a center of mass at a position deviated from the rotational axis of the balancer; means for rotating the balancer at a speed having a predetermined ratio to the rotational speed of the output shaft; and a changing means for changing the distance between the rotational axis of the balancer and the center of mass of the overall balancer by rotating the balancer piece about the rotational axis of the balancer according to the operating condition of the engine.

13. A balancer mechanism as defined in claim 12 in which said at least one balancer piece is mounted on a balancer shaft extending along the rotational axis of the balancer and is provided with splines and the balancer shaft is provided with splines which are engaged with the splines of the at least one balancer piece so that the at least one balancer piece is rotated about the axis of the balancer shaft by moving the balancer piece in the axial direction of the balancer shaft.

14. A balancer mechanism as defined claim 12 in which said balancer comprises a pair of balancer pieces and said changing means changes the angular position of both the balancer pieces with respect to the overall balancer to change the distance between the rotational axis of the balancer and the center of mass of the overall balancer.

15. A balancer mechanism as defined in claim 14 in which said changing means changes the angular position of the balancer pieces in opposite directions by the same angle.

16. A balancer mechanism as defined in claim 14 in which said balancer pieces are respectively provided with splines, and said balancer shaft is provided with first and second splines the helix angles of which intersect with each other, the first splines of the balancer shaft being engaged with the splines of one of the balancer pieces and the second splines of the balancer shaft being engaged with the splines of the other balancer pieces so that the balancer pieces are rotated about the axis of the balancer shaft in opposite directions by moving them in the axial direction of the balancer shaft.

* * * * *